United States Patent [19]
Ueda et al.

[11] Patent Number: 5,620,284
[45] Date of Patent: Apr. 15, 1997

[54] CUTTING TOOL

[75] Inventors: Yoshihisa Ueda, Ibaragi; Hiroshi Shimomura, Tsukuba; Shouji Takiguchi, Iwai; Akira Kanaboshi, Tsukuba, all of Japan

[73] Assignee: Mitsubishi Materials Corporation, Tokyo, Japan

[21] Appl. No.: 545,605

[22] PCT Filed: Mar. 6, 1995

[86] PCT No.: PCT/JP95/00355

§ 371 Date: Jan. 4, 1996

§ 102(e) Date: Jan. 4, 1996

[87] PCT Pub. No.: WO95/24287

PCT Pub. Date: Sep. 14, 1995

[30] Foreign Application Priority Data

| Mar. 7, 1994 | [JP] | Japan | 6-036179 |
| Mar. 7, 1994 | [JP] | Japan | 6-036180 |
| Mar. 7, 1994 | [JP] | Japan | 6-036181 |
| Mar. 7, 1994 | [JP] | Japan | 6-036182 |

[51] Int. Cl.$^6$ ................................. B23B 51/00
[52] U.S. Cl. .................. 408/158; 408/83.5; 408/147
[58] Field of Search ........................ 408/36, 83.5, 153, 408/158, 147, 161, 169; 82/1.4

[56] References Cited

U.S. PATENT DOCUMENTS

| 3,902,386 | 9/1975 | Dressler et al. | 408/158 |
| 4,692,074 | 9/1987 | Smith et al. | 408/36 |
| 4,789,280 | 12/1988 | Dobat et al. | 408/36 |
| 5,044,841 | 9/1991 | Biera et al. | 409/233 |
| 5,427,479 | 6/1995 | Ueda et al. | 408/158 |
| 5,482,412 | 1/1996 | Ueda et al. | 408/158 |

FOREIGN PATENT DOCUMENTS

| 1246405 | 10/1960 | France | 408/83.5 |
| 2808610 | 10/1978 | Germany | 408/158 |
| 176703 | 8/1987 | Japan | 408/153 |
| 281143 | 12/1991 | Japan | 408/153 |

*Primary Examiner*—Daniel W. Howell
*Attorney, Agent, or Firm*—Armstrong, Westerman, Hattori, McLeland & Naughton

[57] ABSTRACT

In a cutting tool optimally used for working a valve hole in a cylinder head of an engine, a U-shaped groove (11) having a U-shaped cross section is formed to extend along a generatrix of a substantially conic tool main body (1), and a slider (160 carrying a cutting tip (5A) is slidably fitted in the U-shaped groove (11). A spacer (12) formed with a serration groove (12a) is detachably mounted between a wall surface (11a) of the U-shaped groove (11) and the slider (16). The slider (16) is formed on its side surface with a serration groove (16a) which engages the serration groove (12a). The slider (16) is biased toward the wall surface (11a) with an elastic force by a biasing means (15) which is provided at another wall surface (11b) of the U-shaped groove (11) and includes a pressing pin (17), a disk spring (18) and a set screw (19). Therefore, abrasion and deformation can be easily coped with by replacing the spacer (12), and the shakiness of the slider (16) can be suppressed, thereby extending the life of the tool and reducing the labor for maintenance.

12 Claims, 8 Drawing Sheets

CUTTING TOOL

BACKGROUND OF THE INVENTION

1. Field of the Technology

The present invention relates to a cutting tool which is optimally used for working, in particular, valve holes in a cylinder head of an engine.

2. Technical Background

Because a valve frequently comes into contact with an opening edge of such a valve hole of the cylinder head, a hard member made of, e.g., a sintered alloy is fitted at this part in order to improve durability or resistance to wear. A cutting tool which is used to work this valve hole includes a reamer such as a gun reamer for finishing a hole and a cutting tip for working the opening edge. The opening is frequently formed to have a tapered surface in conformity with the shape of a valve head. In order to form such a tapered surface, it is desirable that the cutting tip be mounted so as to be slidable a direction oblique to an axis of rotation of the cutting tool.

Figure 16:
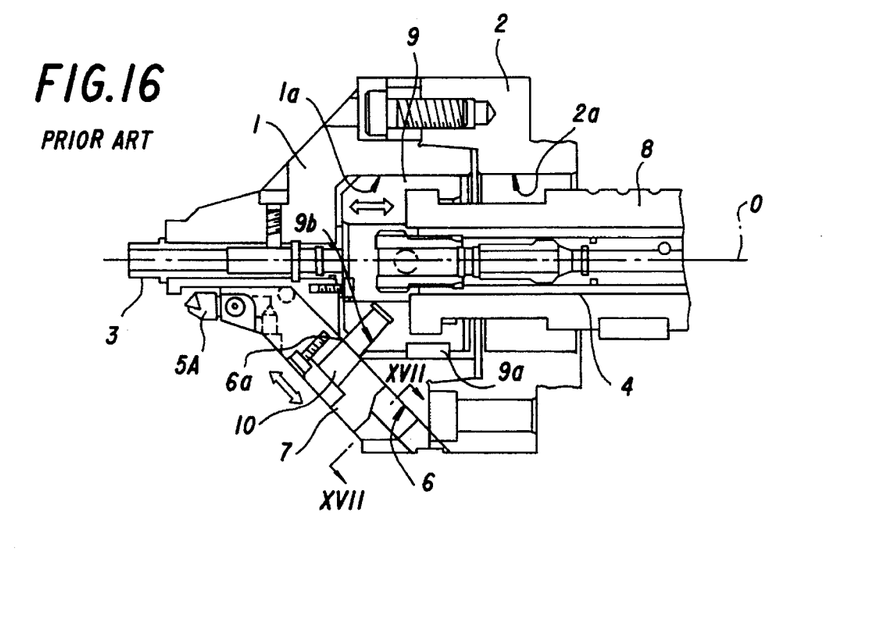
FIG. 16 is a section of a prior art cutting tool.
Figure 17:
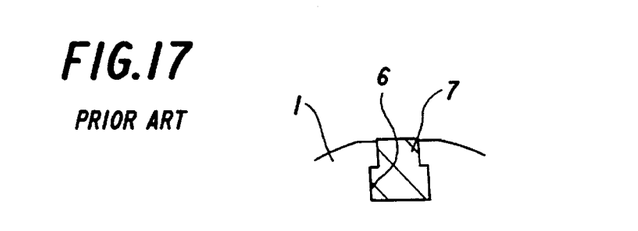
FIG. 17 is a section along line XVII—XVII of FIG. 16.

FIGS. 16 and 17 show an example of a prior art cutting tool used to work the above type of valve hole.

In FIGS. 16 and 17, a tool main body 1 has a substantially conic shape, and is mounted, e.g. at an end of a main shaft of an unillustrated machine tool via an adapter 2. The tool main body 1 is rotated about its longitudinal axis 0 so as to perform the cutting. A bushing 3 is mounted at the leading end of the tool main body 1 along the longitudinal axis 0. A shank of the aforementioned reamer (not shown) such as a gun reamer is fitted into the bushing 3. The hole can be finished by advancing the reamer while rotating the tool main body 1. The reamer is advanced by a shaft 4 coaxially inserted in a slide shaft to be described later.

Three cutting tips 5 are disposed on the outer surface of the leading end of the tool main body 1. The opening edge of the valve hole is worked by these cutting tips 5. It should be appreciated that only one cutting tip 5A is shown in FIG. 16, and the other two cutting tips 5B and 5C are not shown.

The two cutting tips 5B and 5C are directly secured on the tool main body 1, whereas the cutting tip 5A is slidably mounted on the tool main body 1. More specifically, the tool main body 1 is formed with a groove 6 having a T-shaped cross section as shown in FIG. 17 which extends along a generatrix of the conic shape of the tool main body 1, i.e. in a direction oblique to the longitudinal axis 0. A slider 7 is slidably fitted in the T-shaped groove 6, and the cutting tip 5A is detachably secured on the slider 7.

The tool main body 1 and the adapter 2 are formed with holes 1a and 2a, respectively, which extend along the longitudinal axis 0. A slide shaft 8 and a coupling member 9 are inserted into these holes 1a and 2a. The coupling member 9 is fitted in the hole 1a via a key 9a. Accordingly, the coupling member 9 is rotatable about the longitudinal axis 0 integrally with the tool main body 1, and is movable forward and backward in the hole 1a by moving the slide shaft 8 forward and backward. The T-shaped groove 6 of the tool main body 1 communicates with the hole 1a via a hole 6a opening in the bottom surface of the T-shaped groove 6. A coupling pin 10 which is projectable into the hole 1a via the hole 6a is mounted on the slider 7. The slider 7 and the coupling member 9 are connected by inserting the leading end of the coupling pin 10 into an oblique hole 9b formed in the coupling member 9. The slider 7 slides along the T-shaped groove 6 by moving the coupling member 9 forward and backward by means of the slide shaft 8. In other words, the cutting tip 5A slides in the direction oblique to the longitudinal axis 0.

The above-mentioned valve hole is worked by the thus constructed cutting tool as follows. First, the reamer such as the gun reamer is mounted on the bushing 3 and is pulled toward the base end of the tool main body 1 by means of the shaft 4. In this state, the tool main body 1 is rotated and moved forward along the longitudinal axis 0 to bevel the opening of the valve hole by the two cutting tips 5B and 5C. Subsequently, after the tool main body 1 is moved slightly backward, the slide shaft 8 and the coupling member 9 are moved forward while the tool main body is rotated so that the cutting tip 5A is slid via the coupling pin 10 and the slider 7 to form the aforementioned tapered surface at the opening edge of the valve hole. Thereafter, the reamer is moved forward by the shaft 4 while the tool main body 1 is kept rotating so as to finish the inner surface of the valve hole (valve guide hole).

While the tapered surface is formed at the opening edge of the valve hole by the cutting tool as described above, a cutting load acting on the cutting tip 5A is received by the wall surfaces (particularly, a wall surface facing in a rotating direction of the tool) of the T-shaped groove 6 of the tool main body 1 by way of the slider 7. Such a cutting load causes abrasion and deformation on the wall surfaces of the groove 6 after a long-term use. The wall surface are also abraded by a sliding movement of the slider 7 along the T-shaped groove 6.

The abrasion may cause the slider 7 to slide in a shaky manner, thereby reducing a working accuracy of the cutting tip 5A. Specifically, instead of making a linear sliding movement, the slider 7 makes a deviated movement at an abraded portion. As a result, the tapered surface does not form an accurate conic surface, but forms a curved surface bulging outward as in a drum.

In the case where such abrasion occurs in the above cutting tool, to re-adapt the device, the T-shaped groove 6 is widened and smoothed to form new wall surfaces, and a new slider 7 having dimensions and shape in conformity with those of the newly formed T-shaped groove 6 is remanufactured. In this way, the tool main body 1 is reused.

However, if the tool main body 1 is reused in the above manner, the T-shaped groove 6 and the slider 7 have to be reshaped and remanufactured, respectively, each time abrasion occurs. Accordingly, the operation inevitably becomes cumbersome. Especially, since the dimensions and the shape of the slider 7 change each time it is remanufactured, it has to be redesigned. Thus, the reuse of the tool main body 1 may lead to an uneconomical situation.

Further, if abrasion occurs, the T-shaped groove 6 and the slider 7 have to immediately be smoothed and replaced, respectively. Accordingly, a maintenance has to be relatively frequently performed.

Furthermore, since the cutting tip 5A is positioned by the engagement of the slider 7 and the T-shaped groove 6 in the above cutting tool, there is no room to correct shaping errors of the groove 6 and the slider 7. In order to obtain a desired working accuracy, the T-shaped groove 6 and the slider 7 have to be shaped with a high accuracy, thereby making the shaping difficult. There is also a limit in improving the mount rigidity of the slider 7. Insufficient mount rigidity may partially cause the slider 7 to exhibit a shaky movement.

SUMMARY OF THE INVENTION

The present invention was developed in view of the aforementioned background, and an object thereof is to provide a cutting tool which does not require the smoothing of a groove caused by abrasion and the remanufacturing of a slider in association therewith, which reduces a maintenance frequency by suppressing the shakiness of the slider, and which has an improved mount rigidity of the slider.

The invention is directed to a cutting tool, comprising a substantially conic main body which is rotated about its longitudinal axis; a U-shaped groove having a U-shaped cross section and extending along a generatrix of the conic main body; a slider equipped with a cutting tip and slidably mounted in the U-shaped groove; and a coupling member provided in the main body which is rotatable with the main body, movable forward and backward along the longitudinal axis, and engages the slider to slide the slider, wherein a spacer is detachably mounted between one of a pair of wall surfaces of the U-shaped groove facing each other and the slider, the spacer being formed with an engaging portion extending along the generatrix; an engaged portion engageable with the engaging portion is formed on one side surface of the slider which is brought into contact with the spacer; and the slider is biased toward the one wall surface of U-shaped groove with an elastic force.

In the cutting tool thus constructed, since the spacer is detachably mounted between the one side surface of the slider and the one wall surface of the U-shaped groove, a cutting load transmitted from the cutting tip to the slider is received by the one wall surface via the spacer. Accordingly, abrasion and deformation caused by the cutting load occur in the spacer. Since abrasion caused by a sliding movement of the slider also occurs in the spacer, it is not necessary to reshape the U-shaped groove and remanufacture the slider upon abrasion and/or deformation. Therefore, working accuracy can be very easily and economically maintained by replacing these members.

Further, the engaging portion and the engaged portion which engage each other are formed between the spacer and the slider, and the slider is allowed to make a sliding movement when these portions are engaged. Accordingly, the slider is allowed to have an improved mount rigidity. In addition, since the slider is biased toward the one wall surface of the U-shaped groove with the elastic force, the slider is pressed against the spacer with the elastic biasing force even if abrasion occurs between the engaging portion of the spacer and the engaged portion of the slider. As a result, the cutting can be continued by suppressing the shakiness of the slider caused by abrasion.

According to another aspect of the invention, the cutting tool comprises biasing means provided at the other wall surface or the other side surface of the slider facing the other wall surface for biasing the slider toward the one wall surface. The slider is biased with the elastic force of the biasing means.

Preferably, the biasing means comprises a pressing member which is projectable from either the other wall surface of the U-shaped groove or the other side surface of the slider and comes into contact with the other surface; a spring member for pressing the pressing member toward the other surface; and an adjustment member for adjusting a pressing force of the spring member. The slider is biased with the elastic force rendered from the spring member which presses the pressing member, and the elastic force is adjusted by means of the adjustment member.

Preferably, the pressing member comprises a rollable spherical member at its leading end. Such a spherical member stabilizes a direction in which the slider is biased and more securely prevents the slider from becoming shaky.

The biasing means may comprise a flat plate member mounted between the other wall surface of the U-shaped groove and the other side surface of the slider. Since abrasion at the other side surface of the slider occurs in the plate member, the tool main body is less likely to be damaged.

Further, according to another aspect of the invention, the cutting tool further comprises a wedge member which is detachably mounted between the other wall surface and the slider and is thrust toward the bottom surface of the U-shaped groove, thereby pressing the slider toward the one wall surface to engage the engaging portion and the engaged portion; and wedge biasing means for biasing the wedge member toward the bottom surface of the U-shaped groove. As the wedge member is biased toward the bottom surface of the U-shaped groove by the wedge biasing means, the slider is biased toward the one wall surface of the U-shaped groove with the elastic force. Further, since abrasion at the other wall surface of the slider occurs in the wedge member, the damage of the tool main body can be prevented. By thrusting the wedge member, the slider is pressed toward the one wall surface, with the result that the engaging portion and the engaged portion are more strongly engaged to position the slider and the cutting tip. Thus, an error which occurs in forming the slider and the U-shaped groove can be permitted to a certain extent, and accordingly a labor required to form them can be reduced and the mount rigidity of the slider can be improved.

Preferably, the wedge biasing means comprises an adjustment bolt which is spirally inserted through the wedge member into a screw hole formed in the bottom surface of the U-shaped groove, and a spring member which is mounted between a head of the adjustment bolt and the wedge member and is adapted to push the wedge member toward the bottom surface of the U-shaped groove. The wedge member is biased toward the bottom surface of the U-shaped groove with the elastic force of the spring member.

Further, according to another aspect of the invention, the cutting tool comprises a wedge member which is detachably mounted between the other wall surface and the slider, and is thrust toward the bottom surface of the U-shaped groove, thereby pressing the slider toward the one wall surface to engage the engaging portion and the engaged portion, wherein the wedge member is formed with a slit which extends in parallel with the other wall surface of the U-shaped groove along the generatrix, and is elastically deformable in directions to open and close the slit; and wedge biasing means provided at the other wall surface of the U-shaped groove for biasing the wedge member toward the one wall surface and the bottom surface of the U-shaped groove. Accordingly, the slider is biased toward the one wall surface of the U-shaped groove with the elastic force rendered from the wedge biasing means. Further, since the wedge member is formed with the slit extending along the generatrix in parallel with the other wall surface of the U-shaped groove, it can undergo a slight elastic deformation in such directions as to open and close the slit, i.e, in directions in which the wedge member is inclined toward the one and the other wall surfaces of the U-shaped groove. The wedge member undergoes an elastic deformation in the direction to close the slit when it is biased by the wedge biasing means to press the slider against the one wall surface, with the result that the force acting between the wedge member and the slider can be made uniform over the contact surfaces thereof. This strengthens the engagement of the slider and the spacer, and makes the sliding movement of the slider smoother.

Preferably, the wedge biasing means comprises a pressing member which is projectable from the other wall surface of the U-shaped groove and comes into contact with the wedge member, a spring member for pressing the pressing member, and an adjustment member for adjusting a pressing force of the spring member. The wedge member is biased by the pressing member pressed by the spring member.

Further, according to another aspect of the invention, the cutting tool may comprise a wedge member which is detachably mounted between the other wall surface and the slider, and is thrust toward the bottom surface of the U-shaped groove, thereby pressing the slider toward the one wall surface to engage the engaging portion and the engaged portion; and wedge biasing means which is provided in a position of the main body facing the other wall surface of the U-shaped groove and is adapted to bias the wedge member toward the bottom surface of the U-shaped groove. As the wedge member is biased toward the bottom surface of the U-shaped groove by the wedge biasing means, the slider is biased toward the one wall surface of the U-shaped groove with the elastic force.

Preferably, the wedge biasing means comprises an adjustment screw which is spirally mounted in a position of the main body facing the other wall surface of the U-shaped groove, a spring member inserted into a mount hole which is formed such that the adjustment screw is located between the U-shaped groove and the mount hole, and a pressing member having a center portion which comes into contact with the underside of a head of the adjustment screw and opposite ends which come into contact with an upper part of the spring member and an upper part of the wedge member, respectively. As the wedge member is biased toward the bottom surface of the U-shaped groove via the pressing member with a force of the spring member which tires to expand, the slider is biased toward the one wall surface of the U-shaped groove with the elastic force.

Preferably, the engaging portion and the engaged portion are serration grooves extending along the generatrix, respectively. By forming the engaging portion and the engaged portion by the serration grooves, the contact area thereof can be increased to enhance the mount rigidity of the slider. This enables the cutting tip to be positioned more accurately and the cutting to be performed with an improved accuracy.

The above and other (a) objects, (b) advantages, (c) features and (d) aspects of the present invention will be more readily perceived from the following description of the preferred embodiments thereof taken together with the accompanying drawings and claims.

BRIEF DESCRIPTION OF THE DRAWINGS

The present invention illustrated by way of example and not limitation in the accompanying drawings, in which like references indicate like parts, and in which.

DETAILED DESCRIPTION OF THE PREFERRED EMBODIMENTS

Figure 1:
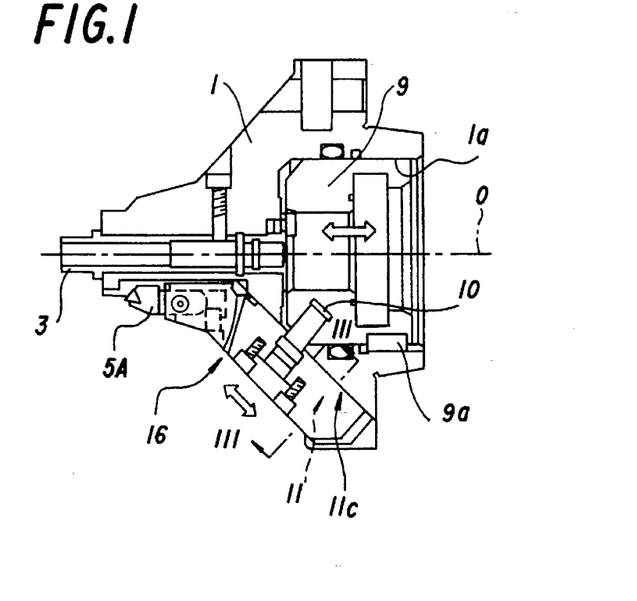
FIG. 1 is a section of a first embodiment according to the invention.
Figure 2:
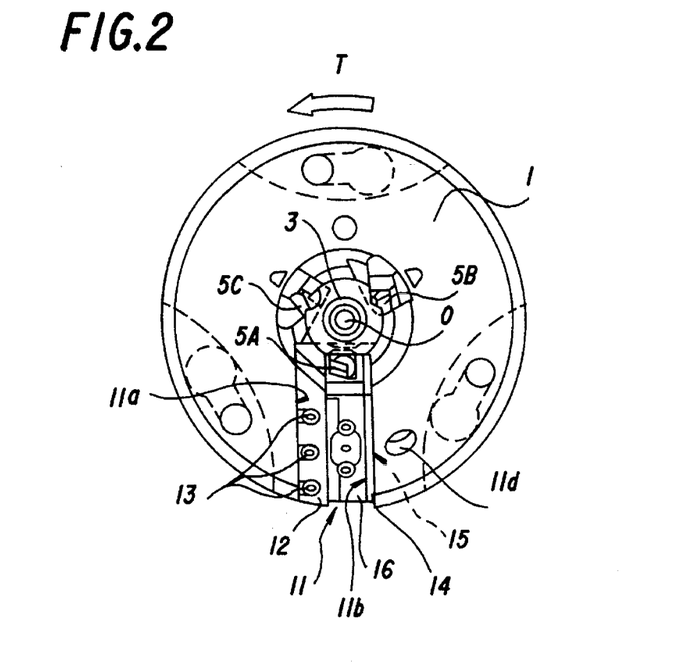
FIG. 2 is a front view of the first embodiment of FIG. 1.
Figure 3:
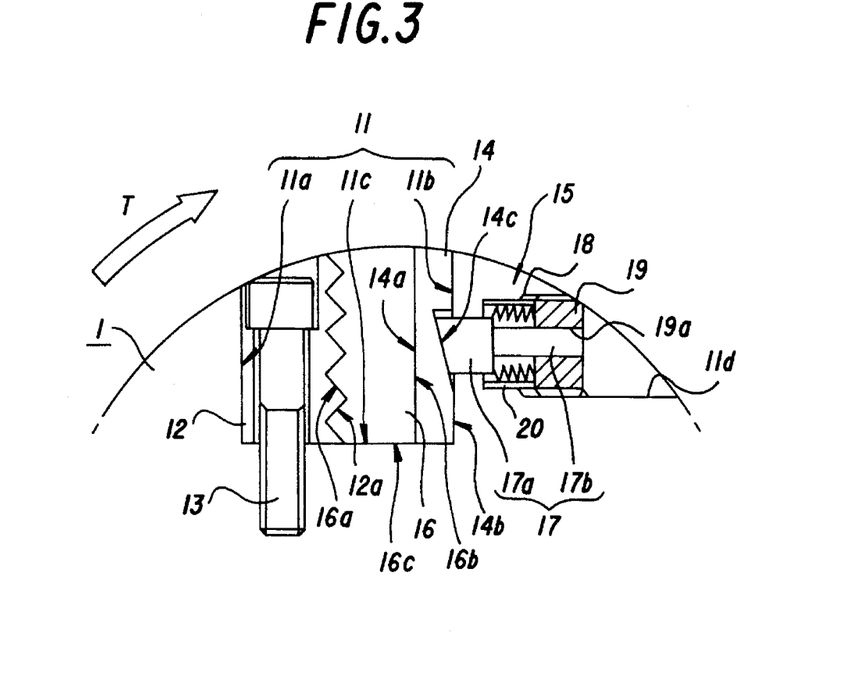
FIG. 3 is a section along line III—III of FIG. 1.

FIGS. 1 to 3 show a first embodiment of the invention. Since a basic construction of the first embodiment is similar to that of the prior art cutting tool shown in FIG. 16, the same reference numerals are given to common parts and no detailed description is given thereto. In FIG. 1 to 3, the adapter 2 and the slide shaft 8 are not shown.

In this embodiment, instead of the T-shaped groove 6 formed in the tool main body 1 of the prior art cutting tool, there is formed a U-shaped groove 11 having a U-shaped cross section. Specifically, the U-shaped groove 11 is defined by a pair of parallel and opposite wall surfaces 11a, 11b and a bottom surface 11c extending in a direction normal to the wall surfaces 11a, 11b. The U-shaped groove 11 extends along a generatrix of a substantially conically shaped tool main body 1. On the wall surface 11a of the U-shaped groove 11 facing forward with respect to a rotating direction T of the tool (a counterclockwise direction in FIG. 2), a spacer 12 is detachably mounted by means of clamping screws 13.

A flat plate member 14 is mounted on the other wall surface 11b of the U-shaped groove 11 facing backward in the rotating direction T. Further, a biasing means 15 of this embodiment is provided in the wall surface 11b.

In a clearance defined by the spacer 12, the plate member 14, and the bottom surface 11c of the U-shaped groove 11, a slider 16 is slidably fitted along the generatrix, i.e., in a direction oblique to a longitudinal axis 0.

The spacer 12 is a plate member which extends over substantially the entire length of the U-shaped groove 11 when it is mounted on the tool main body 1. The spacer 12 is mounted in close contact with the wall surface 11a and the bottom surface 11c of the U-shaped groove 11. Further, a serration groove 12a having a wavelike cross section and extending along the generatrix is formed on a side surface of the spacer 12 facing inward of the U-shaped groove 11, i.e. the side surface of the spacer 12 facing forward with respect to the rotating direction T. The serration groove 12a acts as an engaging portion in this embodiment.

On the other hand, the plate member 14 is detachably mounted to extend over substantially the entire length of the U-shaped groove 11 in close contact with the wall surface 11b and the bottom surface 11c of the U-shaped groove 11. A side surface 14a of the plate member 14 facing backward with respect to the rotating direction T is parallel with a side surface 14b abutting the wall surface 11b. A notch 14c extending along the generatrix is formed substantially in the middle of the side surface 14b abutting the wall surface 11b. The bottom surface of the notch 14c is so inclined as to conform to the shape of a leading end surface of a pressing pin of the biasing means 15 (described below). Specifically, the bottom surface of the notch 14c is such that it gets closer to the side surface 14b as it extends more toward the bottom surface 11c of the U-shaped groove 11.

The slider 16 is a member in the form of a rectangular pillar which is bent at an obtuse angle as shown in FIG. 1. The base end of the slider 16 is located in the U-shaped groove 11, and the cutting tip 5A is detachably mounted at the leading end thereof.

At the base end of the slider 16, a serration groove 16a having a wavelike cross section is formed on the side surface facing the wall surface 11a, i.e., the side surface facing backward with respect to the rotating direction T. The serration groove 16a comes into close contact with the serration groove 12a of the spacer 12 when the slider 16 is mounted on the tool main body 1. The serration groove 16a acts as an engaged portion in this embodiment. As shown in FIG. 3, the slider 16 is slidably fitted in the aforementioned clearance with the serration groove 16a engaging with the serration groove 12a, with a side surface 16b of its base end facing forward with respect to the rotating direction T in close contact with the side surface 14a of the plate member 14, and with its bottom surface 16c in close contact with the bottom surface 11c of the U-shaped groove 11.

A mount hole 11d is formed through the wall surface 11b of the U-shaped groove 11. The mount hole 11d extends in a direction normal to the wall surface 11b, and it opens in the outer surface of the tool main body 1. In the mount hole 11d, a pressing pin (pressing member) 17, a disk spring (spring members) 18, a mount screw (adjustment member) 19 are mounted in this order from the wall surface 11b. These members constitute the biasing means 15 of this embodiment. A cylindrical adjustment ring 20 is fitted into the mount hole 11d at the portion closer to the wall surface 11b. The leading end of the mount screw 19 is in contact with the adjustment ring 20.

The pressing pin 17 is a shaft member having a head 17a of a larger diameter and a leg 17b of a smaller diameter. The pressing pin 17 is inserted into the mount hole 11d formed in the wall surface 11b such that the head 17a slightly projects from the wall surface 11b. Further, the leading end face of the pressing pin 17 is inclined such that it gets closer to the wall surface 11b as it extends toward the bottom surface 11c. This leading end face is brought into close contact with the bottom surface of the notch 14c of the plate member 14, thereby engaging the plate member 14 and the pressing pin 17.

The disk spring 18 is fitted around the leg 17b of the pressing pin 17 in a compressed state within the adjustment ring 20. The leading end of the disk spring 18 is in contact with the head 17a of the pressing pin 17, and the base end thereof is in contact with the leading end face of the mount screw 19. The disk spring 18 constantly presses the pressing pin 17 towards the wall surface 11a of the U-shaped groove 11 with a specified elastic force. The pressing force of the pressing pin 17 is translated via the plate member 14 into a specified biasing force for biasing the slider 16 toward the wall surface 11a of the U-shaped groove 11.

The mount screw 19 is a ring member which is spirally engaged with an internal thread formed at the opening of the mount hole 11d on the outer surface of the tool main body 1, and is formed in its center with an opening 19a into which the leg 17b of the pressing pin 17 is inserted. In this embodiment, the mount screw 19 is moved forward and backward by being fastened (i.e. rotated one direction) and loosened (i.e. rotated the opposite direction), respectively. In this way, the pressing force of the disk spring 18 for pressing the pressing pin 17 is adjusted, i.e., strengthened or weakened. Accordingly, the biasing force of the pressing pin 17 for biasing the slider 16 via the plate member 14 is also adjustable. In this embodiment, the position of the mount screw 19 can be determined by bringing the leading end thereof into contact with the adjustment ring 20.

In this embodiment as well, three cutting tips 5 are mounted at the leading end of the tool main body 1. One cutting tip 5A is mounted on the slider 16 and is thus slidable. On the other hand, the other two cutting tips 5B and 5C are secured on the leading end of the tool main body 1, as shown in FIG. 2. The three cutting tips 5 are equally spaced apart with respect to a circumferential direction of the tool main body 1 and are displaced with respect to the longitudinal axis 0 of the tool main body 1.

Figure 4:
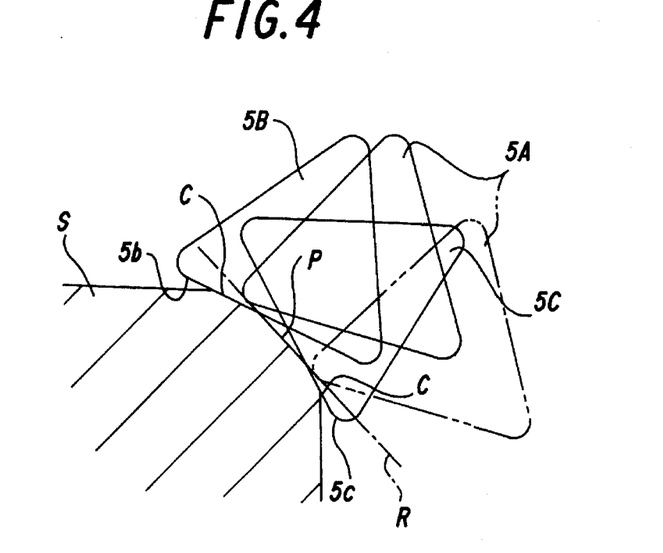
FIG. 4 is a diagram showing a trace of rotation of cutting tips 5A, 5B and 5C of the first embodiment shown in FIG. 1 about a longitudinal axis 0, FIG. 5 corresponding to FIG. 3 is a section of a second embodiment according to the invention, FIG. 6 corresponding to FIG. 3 is a section of a third embodiment according to the invention.

FIG. 4 shows a trace of rotation of the cutting tips 5A, 5B and 5C about the longitudinal axis 0. As shown in FIG. 4, the two cutting tips 5B and 5C are disposed such that their cutting edges 5b and 5c intersect at an obtuse angle to each other in the trace of rotation. The cutting tip 5A is disposed such that a trace R of movement of a cutting edge 5a is located between the cutting edges 5b and 5c of the cutting tips 5B and 5C and intersects at an obtuse angle to the cutting edges 5b and 5c in the trace of rotation by sliding the slider 16.

In the cutting tool thus constructed as well, the tool main body 1 is mounted at the end of a main shaft of a machine tool via an adapter or the like after a reamer such as a gun reamer is mounted at its leading end, so as to be used for the cutting.

While being rotated about the longitudinal axis 0 after the reamer is pulled toward the base end, the tool main body 1 is moved forward along the longitudinal axis 0 so that the cutting tips 5B and 5C form bevelled surfaces C, C on the opening of the hole as shown in FIG. 4. Identified by reference numeral S in FIG. 4 is a hard member made of sintered alloy fitted on the periphery of the opening of a valve hole or like hole as described above.

After the bevelled surface C, C are formed, the tool main body 1 is temporarily slightly moved backward while being kept rotating. Subsequently, the coupling member 9 is moved forward by pushing an unillustrated slide shaft out, thereby sliding the slider 16 along the generatrix via the coupling pin 10. As a result, the cutting tip 5A is moved along the trace A to form a tapered surface P on the opening of the hole.

Thereafter, the reamer such as the gun reamer is moved forward to enter the valve hole while the tool main body 1 is kept rotating, thereby finishing the valve hole.

In the above cutting tool, a cutting load acting on the cutting tip 5A while the tapered surface P is formed is mainly received by the spacer 12 located backward with respect to the rotating direction T via the slider 16. Accordingly, abrasion and deformation caused by such a cutting load occurs in the spacer 12, and therefore the U-shaped groove 11, that is, the tool main body 1 is free from abrasion and deformation. Further, since abrasion caused by sliding the slider 16 occurs in the spacer 12 and the plate member 14, and the likelihood that the tool main body 1 is damaged can be suppressed.

Since the spacer 12 and the plate member 14 are detachably mounted on the tool main body 1, if abrasion and/or deformation occur in these members, work accuracy and the like can be very easily recovered by replacing these members. Further, since the replacement member is allowed to have the same standard as the members to be replaced, it is not necessary to redesign the member each time it is abraded. Hence, this cutting tool is very economical. The same may be said of the case where the slider 16 is replaced.

Further, in the above cutting tool, the biasing means 15 for biasing the slider 16 toward the wall surface 11a via the plate member 14 is provided at the wall surface 11b of the U-shaped groove 11. Accordingly, the slider 16 is constantly pressed against the spacer 12 with a fixed elastic biasing force. Thus, even if the engaging portion (serration groove 12a) of the spacer 12 and/or the engaged portion (serration groove 16a) of the slider 16 are abraded and/or deformed due to the cutting load and the sliding movement of the slider 16, the engaging force can be maintained to prevent the slider 16 from becoming shaky. Accordingly, according to the above cutting tool, a slight abrasion does not deter the continuation of the cutting operation. Thus, a life of the tool can be extended by extending a period between replacements of the spacer 12 and the slider 16, and a labor required for maintenance can be reduced.

Further, by constantly biasing the slider toward the wall surface 11a with the fixed force, the mount rigidity of the slider 16 can be improved. Even upon an excessively large cutting load besides abrasion and deformation, the slider 16 can be soundly held to prevent its shakiness, with the result that a stable cutting operation can be performed. The improved mount rigidity of the slider 16 leads to an improved mount accuracy thereof, which enables the cutting tip 5A to be accurately positioned. Thus, the cutting accuracy of the cutting tool can be improved.

Further, according to this embodiment, the biasing means 15 includes the pressing pin 17 as a pressing member, the disk spring 18 as a spring member, the mount screw 19 as an adjusting member. The pressing force of the disk spring 18 is adjusted by moving the mount screw 19 forward and backward as described above. In this manner, the biasing force of the biasing means 15 is made adjustable. This can prevent the sliding movement of the slider 16 from being deterred by an excessively large biasing force. Further, if the engaging portion and the engaged portion are abraded, the shakiness of the slider 16 can be more securely prevented by strengthening the biasing force. As a result, the life of the tool can be extended further.

Furthermore, according to this embodiment, the adjustment ring 20 is insertably mounted in the mount hole 11d for accommodating the biasing means 15 near the wall surface 11b. Upon contact with the adjustment ring 20, the mount screw 19 cannot be fastened any further to move toward the wall surface 11b. Accordingly, by replacing the adjustment ring 20 with the one having a different height, a fully fastened position of the mount screw 19 can be suitably set. By adjusting the biasing force by fastening the mount screw 19 until it reaches its fully fastened position, the biasing force can be adjusted more simply and accurately.

In addition, according to this embodiment, the pressing pin 17 of the biasing means 15 biases the slider 16 via the plate member 14. Thus, the biasing force of the biasing means 15 can be uniformly transmitted to the slider 16, thereby stably engaging the spacer 12 and the slider 16, and the slider 16 can be smoothly slid.

Further, according to this embodiment, the adjustment of the biasing force of the biasing means 15 by the rotation of the mount screw 19 can be made from the side of the mount hole opening in the outer surface of the tool main body 1. Therefore, the biasing force can be very easily adjusted without necessitating detachment of the slider 16 and other members.

Furthermore, according to this embodiment, the engaging portion of the spacer 12 and the engaged portion of the slider 16 are the serration grooves 12 and 16a having a wavelike cross section, respectively, which can be brought into close engagement with each other. The mount rigidity of the slider 16 is thus enhanced by augmenting the contact area of these two portions. Thus, the cutting tip 5A can be positioned with an improved accuracy, which leads to a far more accurate cutting operation.

Although the engaging portions are formed by the serration grooves 12a and 16a having a wavelike cross section in this embodiment, they may be, for example, serration grooves having a saw toothed cross section. Such serration grooves also augment the contact area of the engaging portion and the engaged portion, thereby leading to an improved mount rigidity of the slider 16. Alternatively, the engaging portion and the engaged portion may simply be formed by a key-like projection and a recess having a mating shape. Even with these engaging and engaged portions, if the spacer 12 and the biasing means 15 are provided, the slider 16 can be replaced in an economical manner and, even upon abrasion, can make a very smooth sliding movement. Further, although only the single biasing means 15 is shown in this embodiment, a plurality of biasing means may be disposed in parallel along the generatrix along which the slider 16 slides in order to further enhance the abovementioned effects.

Figure 5:
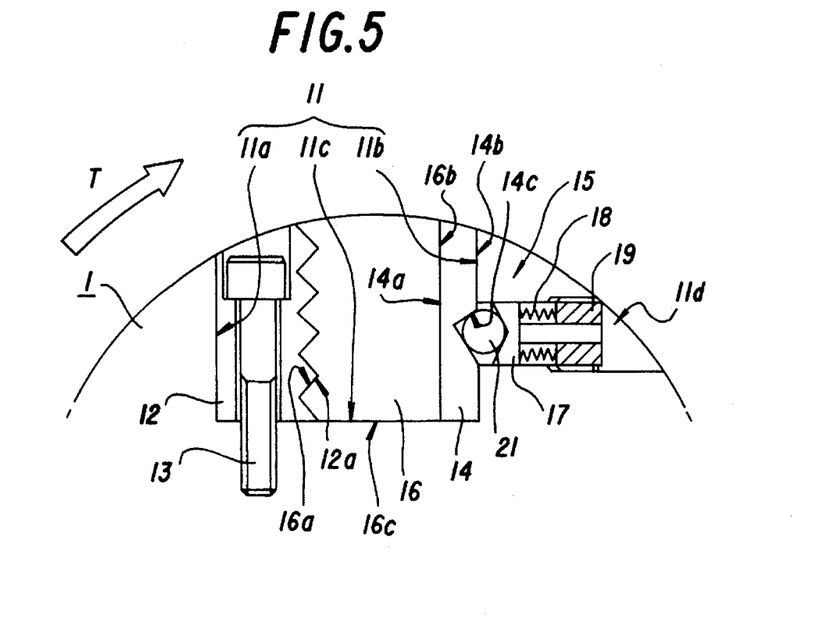

FIG. 5 shows a second embodiment of the invention. Elements in common with the first embodiment are identified by the same reference numerals, and no description thereof is given.

In the second embodiment, the leading end face of the pressing pin 17 of the biasing means 15 is formed into a conic recess, and a metal ball (spherical member) 21 is rollably disposed in this conic recess. Further, the notch 14c of the plate member 14 is so formed as to have a V-shaped cross section, and the metal ball is in contact with the bottom surface of the notch 14c.

In the cutting tool thus constructed as well, abrasion and deformation caused by the cutting load and the sliding movement of the slider 16 occur in the spacer 12 and the plate member 14, and the slider 16 is biased toward the wall surface 11a of the U-shaped groove 11 via the plate member 14 by the biasing means 15. Accordingly, the second embodiment can basically realize the same effects as the first embodiment.

In addition, according to this embodiment, the metal ball 21 is rollably mounted at the leading end of the pressing pin 17 of the biasing means 15 and is in contact with the bottom surface of the V-shaped notch 14c of the plate member 14 so as to bias the slider 16 via the plate member 14. Thus, according to this embodiment, a pressing force resulting from the projection of the pressing pin 17 of the biasing means 15 can be transmitted from the plate member 14 to the slider 16 constantly in a fixed direction. This stabilizes the direction in which the slider 16 is biased, thereby more securely preventing the slider 16 from becoming shaky. It should be appreciated that an adjustment ring similar to the one of the first embodiment may be insertably fitted in the mount hole 11d near the wall surface 11b in the biasing means of the second embodiment.

Figure 6:
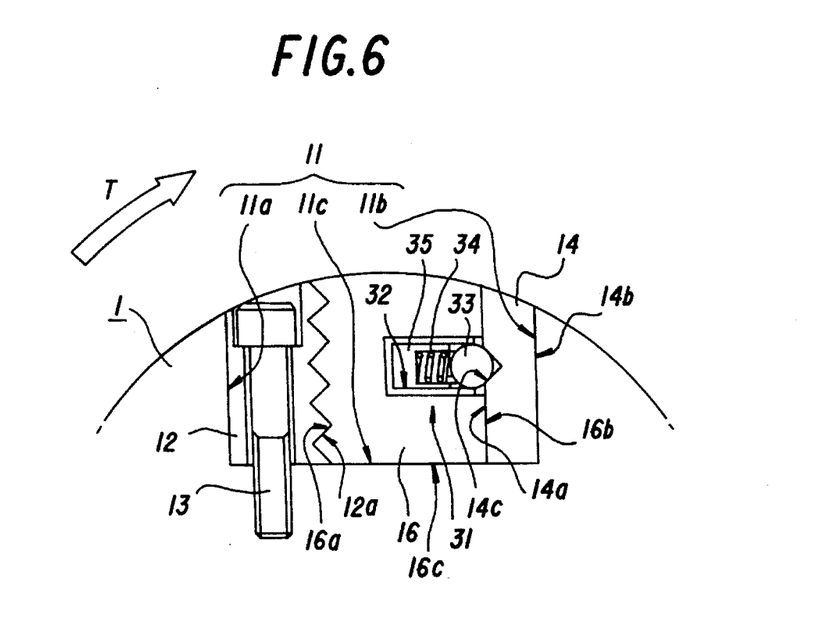

FIG. 6 shows a third embodiment of the invention. Elements in common with the first and second embodiments are identified by the same reference numerals, and no description thereof is given.

This embodiment differs from the first and the second embodiments in the following points. A biasing means 31 is not provided at the wall surface 11b of the U-shaped groove 11, but at the side wall 16b of the slider 16 facing the wall surface 11b. This biasing means 31 includes no pressing pin, but instead it includes a set screw (adjustment member) 35 as a pressing member. The set screw 35 is spirally inserted into a mount screw hole 32 which is open in the side surface 16b of the slider 16 in a direction normal thereto. The biasing means also includes a metal ball 33 as a spherical member and a coil spring (spring member 34). A notch 14c, shown in FIG. 6, formed in the plate member 14, can be a groove which extends along a length of the plate member 14 such that the slider can slide relative thereto with the metal ball 33 within the groove.

However, the cutting tool thus constructed has basically the same effects as the first embodiment since the spacer 12 is mounted between the slider 16 and the wall surface 11a of the U-shaped groove 11 and since the slider 16 is biased toward the wall surface 11a by a counteraction of a force with which the biasing means 31 presses the wall surface 11b of the U-shaped groove 11 via the plate member 14.

Further, the same additional effect as the second embodiment shown in FIG. 5 can be obtained since the leading end of the pressing member of the biasing member 31 is the metal ball (spherical member) 33. The position of the set screw 35 in the screw hole 32 can be adjusted by fastening and loosening the set screw 35, thereby adjusting the pressing force of the coil spring 34 to adjust the biasing force.

In addition, since the biasing means 31 is built in the slider 16, the mount hole for the biasing means 31 is not open in the outer surface of the tool main body 1. Therefore, the third embodiment is advantageously free from an undesirable incident where chips produced during the cutting get caught in such an opening.

It should be appreciated that the biasing means 15 and 31 of the first to third embodiments may be provided at the wall surface 11b of the U-shaped groove 11, namely, at the tool main body 1, or may conversely be provided at the side surface of the slider 16 as in the third embodiment.

Figure 7:
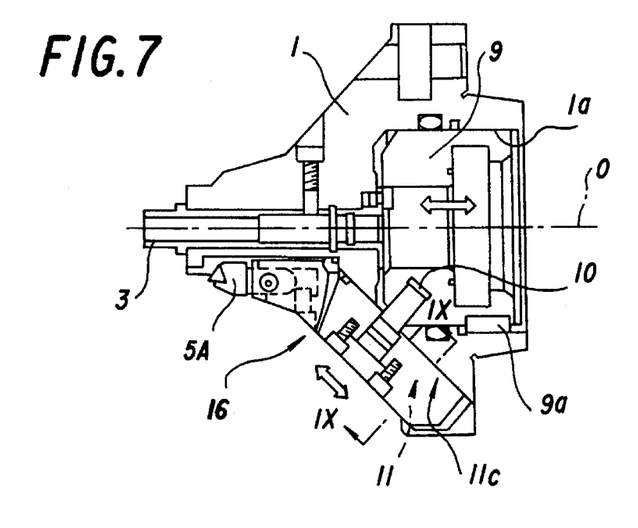
FIG. 7 is a section of a fourth embodiment according to the invention.
Figure 8:
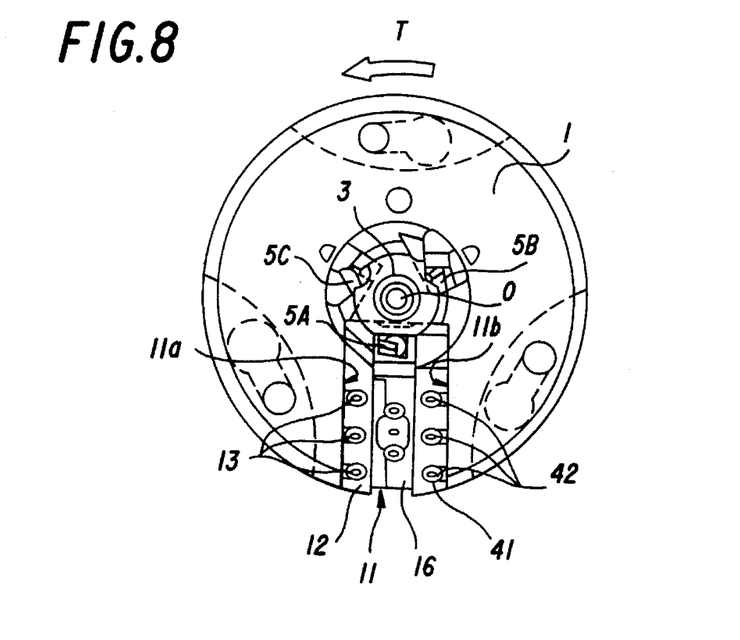
FIG. 8 is a front view of the fourth embodiment of FIG. 7.
Figure 9:
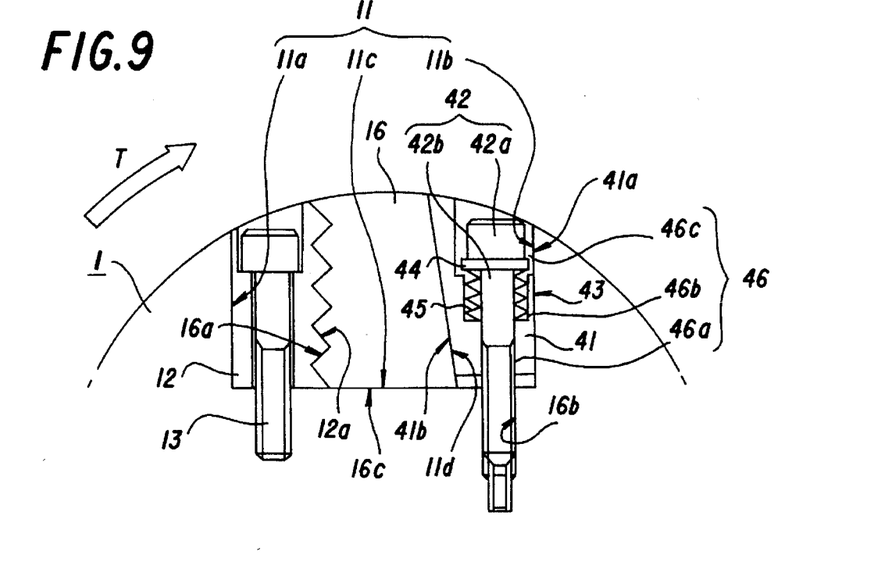
FIG. 9 is a section along line IX—IX of FIG. 7.

FIGS. 7 to 9 show a fourth embodiment of the invention. Elements in common with the first embodiment shown in FIGS. 1 to 3 are identified by the same reference numerals, and accordingly no detailed description thereof is given.

In this embodiment, instead of the T-shaped groove 6 formed in the tool main body 1 of the prior art cutting tool, there is formed a U-shaped groove 11 having a U-shaped cross section. Specifically, the U-shaped groove 11 is defined by a pair of parallel and opposite wall surfaces 11a, 11b and a bottom surface 11c extending in a direction normal to the wall surfaces 11a, 11b. The U-shaped groove 11 extends along a generatrix of a substantially conically shaped tool main body 1. A spacer 12 and a wedge member 41 are detachably mounted by means of clamping bolts 13 and 42 on the wall surfaces 11a and 11b of the U-shaped groove 11 facing forward and backward with respect to a rotating direction T of the tool, respectively. The clamping bolts 42 for mounting the wedge member 41 act also as adjustment bolts of a biasing means to be described later.

A slider 16 is fitted in a clearance defined by the spacer 12, the wedge member 41 and the bottom surface 11c of the U-shaped groove 11 and is slidable along the generatrix, i.e., in a direction oblique to a longitudinal axis 0.

Similar to the spacer 12, the wedge member 41 extends over the entire length of the U-shaped groove 11 when it is mounted on the tool main body 1. The wedge member 41 is mounted such that its surface 41a facing forward with respect to the rotating direction T is in close contact with the wall surface 11b. Further, a surface 41b of the wedge member 41 facing inwardly of the U-shaped groove 11, i.e, facing backward with respect to the rotating direction T is a slanting surface which extends more toward the side surface 41a as it extends more toward the bottom surface 11c of the U-shaped groove 11.

A side surface 16b of the slider 16, which is opposite to a side surface where a serration groove 16a is formed and which faces the wall surface 11b, is a slanting surface having an inclination in conformity with that of the side surface 41b of the wedge member 41. Thus, the side surface 16b extends further away from the side surface of the slider 16 where the serration groove 16a is formed as it extends toward the bottom surface 11c of the U-shaped groove 11. As shown in FIG. 9, the slider 16 is slidably fitted in the clearance while engaging the serration groove 16a with a serration groove 12a of the spacer 12 and with its side surface 16b and its bottom surface 16c in close contact with the side surface 41b of the wedge member 41 and the bottom surface 11c of the U-shaped groove 11, respectively.

The wedge member 41 is formed with a wedge biasing means 43. In this embodiment, the wedge biasing means 43 includes clamping bolts 42 as adjustment bolts, washers 44 disposed at the underside of heads 42a of the clamping bolts 42, and disk springs 45 as spring members mounted between the washers 44 and the wedge member 41.

More specifically, screw holes 11d are formed in the bottom surface 11c of the U-shaped groove 11 in the vicinity of the wall surface 11b. The screw holes 11d extend in a direction normal to the bottom surface 11c. On the other hand, the wedge member 41 is formed with through insertion holes 46 which are coaxial with the screw holes 11d in a mounted state of the wedge member 41. The diameter of each insertion hole 46 increases at three stages as it extends from the bottom surface 11c of the U-shaped groove 11 (bottom side in FIG. 9) toward the outer surface of the tool main body 1 (top side in FIG. 9). A shaft 42b of each clamping bolt 42 is inserted through a lower hole portion 46a having a smallest diameter, and is then spirally inserted into the screw hole 11d. Further, the head 42a is accommodated in an upper hole portion 46c of the insertion hole 46 having a largest diameter.

The disk spring 45 is loosely mounted on the shaft 42b of the corresponding clamping bolt 42, and is accommodated in a middle hole portion 46b of the insertion hole 46 while being compressed. In this state, the upper end of the disk spring 45 is in contact with the washer 44 and the lower end thereof is in contact with an annular bottom surface of the middle hole portion 46b of the insertion hole 46.

Thus, the bottom surface of the hole portion 46b is constantly pressed with an elastic force of the disk spring 45 which tries to expand, and accordingly the wedge member 41 is biased to be constantly pressed toward the bottom surface 11c along the wall surface 11b of the U-shaped groove 11. Further, the force of the disk spring 45 or pressing the bottom surface of the hole portion 46b can be suitably adjusted by fastening and loosening the clamping bolt 42 as an adjustment bolt in the screw hole 11d. In other words, the force of the wedge biasing means 43 for biasing the wedge member 41 is made adjustable.

Further, in this embodiment, a bottom part of the screw hole 11d is formed into a cylindrical hole, and a leading end of the clamping bolt 42 is formed into a cylindrical shaft having a diameter smaller than that of the cylindrical hole. A maximum fastening amount of the clamping bolt 42 can be adjusted by bringing the leading end of the clamping bolt 42 into contact with the bottom of the screw hole 11d. Therefore, according to the invention, a clamping force can be adjusted by adjusting the length of the clamping bolt 42. However, in this case, the clamping bolt 42 and the screw hole 11d are formed such that the leading end of the bolt 42 can be brought into contact with the bottom of the screw hole 11d as described above.

Although three wedge biasing means 43 are disposed along the generatrix in the wedge member 41 in this embodiment (shown in FIG. 8), the number of the wedge biasing means 43 may suitably be set depending upon the size of the tool main body 1, working conditions, etc. It is contemplated to dispose at least one wedge biasing means 43 in the wedge member 41. Further, instead of the disk spring 45, a coil spring may be used as a spring member.

In the cutting tool thus constructed, abrasion and deformation caused by the cutting load acting on the cutting tip 5A and by the sliding movement of the slider 16 also occur in the spacer 12 and in the wedge member 41. Accordingly, the tool main body 1 will not be damaged. Since the spacer 12 and the wedge member 41 are detachably mounted on the tool main body 1 by the clamping bolts 14 and 42, respectively, when these members are abraded and deformed, working accuracy can be very easily restored by replacing them.

Further, in this embodiment, by thrusting the wedge member 41 toward the bottom surface 11c of the U-shaped groove 11, a wedging force acts between the side surface 16b of the slider 16 and the side surface 41b of the wedge member 41 which are inclined and in close contact with each other. Thereby, the slider 16 is pressed against the wall surface 11a of the U-shaped groove 11, with the result that the serration groove 16a (engaged portion) comes into engagement with the serration groove (engaging portion) of the spacer 12. Since the serration grooves 12a and 16a are more securely engaged, the cutting tip 5A can be positioned with an improved accuracy.

Further, in this embodiment, since the wedge member 41 is formed with the wedge biasing means 43 and is constantly biased toward the bottom surface 11c of the U-shaped groove 11 by the wedge biasing means 43, the aforementioned wedging force constantly acts independently of whether or not the cutting is being performed. Thus, the slider 16 is kept pressed against the wall surface 11a of the U-shaped groove 11 according to the elastic forces of the disk springs 45 of the biasing means 43. Therefore, this embodiment also demonstrates the same effects as the first to third embodiments.

Further, in this embodiment, the biasing force of the wedge biasing means 43 can be adjusted through the adjustment of the pressing forces of the disk springs 45 by loosening and fastening the clamping bolts 42 as described above. Accordingly, the force of the wedge member 41 for pressing the slider 16 can be suitably adjusted. Furthermore, in this embodiment, the maximum fastening amount of the clamping bolts 42 can be adjusted by bringing the leading ends of the clamping bolts 42 into contact with the bottom of the screw holes 11d. Therefore, the pressing forces of the disk springs 45 can be kept at a fixed lever by suitably setting the length of the clamping bolts 42. By adopting the clamping bolts and the screw holes as described above, the biasing force can be desirably adjusted. Particularly, when assembling the cutting tool, any one can easily obtain a fixed biasing force.

In this embodiment, the opposite wall surfaces 11a and 11b of the U-shaped groove 11 are formed to be parallel with each other, and the side surface 41b of the wedge member 41 and the side surface 16b of the slider 16 are formed into slanting surfaces such that the slider 16 is pressed by the wedge member 41. However, the wall surface 11b of the U-shaped groove 11 and the side surface 41a of the wedge member 41 which faces forward with respect to the rotating direction T and which is in close contact with the wall surface 11b may be formed into slanting surfaces which extend more toward the wall surface 11a as they extend more toward the bottom surface 11c, and, in such case, the side surface 16b of the slider 16 and the side surface 41b of the wedge member 41 may be formed to be parallel with the wall surface 11a when the slider 16 and the wedge member 41 are mounted on the tool main body 1. The cutting tool thus constructed is advantageous in that it can be easily manufactured because it is not necessary to form a slanting surface on the slider 16.

Figure 10:
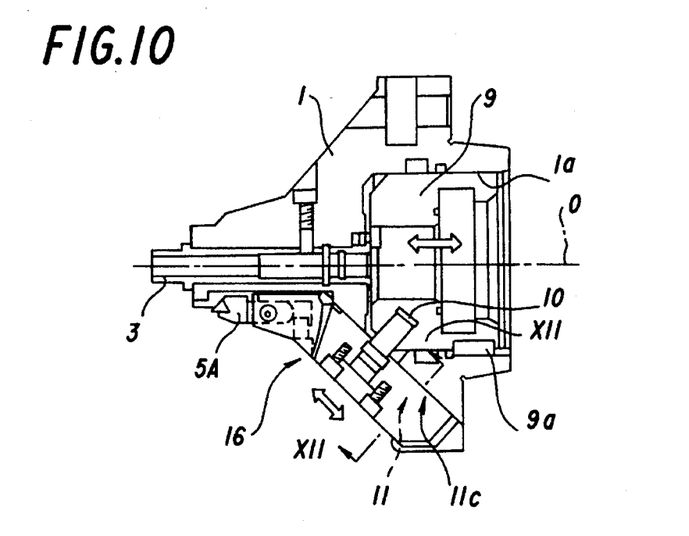
FIG. 10 is a section of a fifth embodiment according to the invention.
Figure 11:
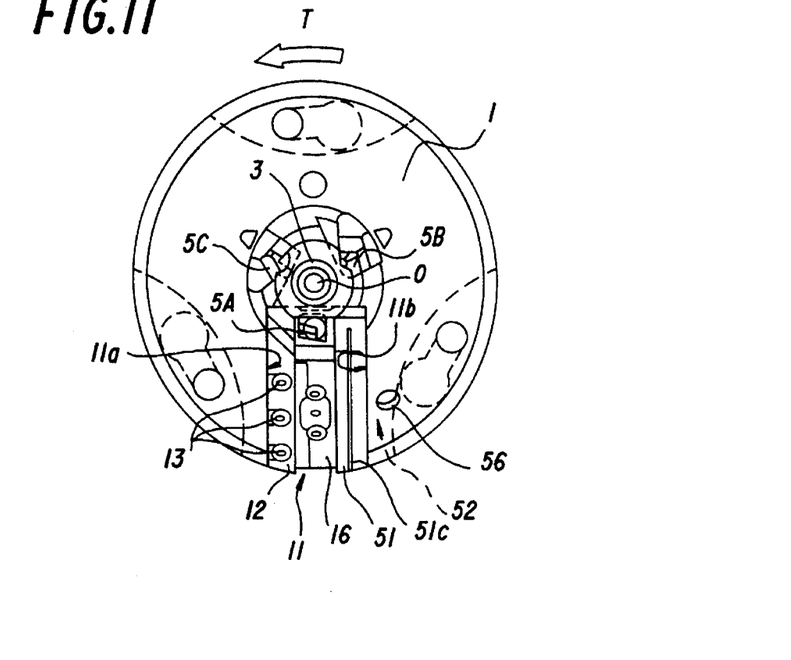
FIG. 11 is a front view of the fifth embodiment of FIG. 10.
Figure 12:
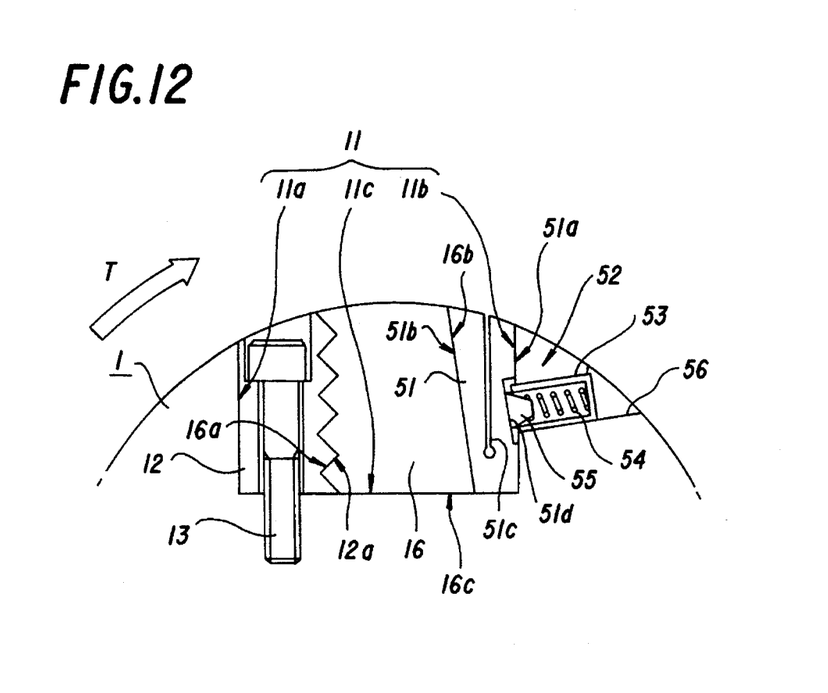
FIG. 12 is a section along line XII—XII of FIG. 10.

FIGS. 10 to 12 show a fifth embodiment. Elements in common with the first to fourth embodiments are identified by the same reference numerals, and no detailed description thereof is given.

In the fifth embodiment, a wedge member 51 is detachably mounted at the wall surface 11b of the U-shaped groove 11 facing backward with respect to the rotating direction T. The wedge member 51 is formed with a slit 51c with extends from the surface of the wedge member 51 located on the outer surface of the tool toward the bottom surface 11c in parallel with the side surface 51a of the wedge member 51, i.e. with the wall surface 11b, and runs along the generatrix. The slit 51c permits the wedge member 51 to undergo an elastic deformation in directions to open and close the slit 51c.

Although the slit 51c extends from the surface of the wedge member 51 located on the outer surface of the tool, it may be formed to extend from the surface of the wedge member 51 located on the bottom surface 11c of the U-shaped groove 11 toward the outer surface of the tool. Alternately, a plurality of slits may be formed to extend alternatively from the outer surface of the tool and from the bottom surface 11c of the U-shaped groove 11. Further, although the slit 51c is formed to be parallel with the side surface 51a of the wedge member 51, i.e., with the wall surface 11b of the U-shaped groove 11, it may be, for example, formed to be parallel with the side surface 51b of the wedge member 51. In other words, it is sufficient for the slit 51c to extend along the generatrix and to be in parallel with the wall surface 11b.

Further, a wedge biasing means 52 is provided at the wall surface 11b of the U-shaped groove 11. The wedge biasing means 52 includes a set screw equipped with a spring in this embodiment. Specifically, a coil spring (spring member) 54 is loosely inserted into a cylindrical bottomed set screw (adjustment member) 53 having a thread formed on its outer surface, and a pressing member 55 is disposed at the leading end of the coil spring 54. The set screw 53 is spirally inserted into a screw hole 56 extending from the outer surface of the tool main body 1 to the wall surface 11b of the U-shaped groove 11 such that the pressing member 55 projects from the wall surface 11b.

In the side surface 51a of the wedge member 51, a notch 51d is so formed as to extend along the generatrix in a position corresponding to the opening of the screw hole 56 in the wall surface 11b. The pressing member 55 projecting from the wall surface 11b engages the notch 51d. The screw hole 56 extends, as shown in FIG. 12, in a direction oblique to the wall surface 11a of the U-shaped groove 11 and the bottom surface 11c normal to the wall surface 11a. Accordingly, the wedge member 51 receives a biasing force from the wedge biasing means 52 to be pressed toward the wall surface 11a and the bottom surface 11c with the elastic force.

In the cutting tool thus constructed, the wedge member 51 is formed with the slit 51c, and is elastically deformable in such directions as to open and close the slit 51. Thus, when the wedge member 51 presses the slider 16 upon the receipt of the biasing force from the wedge biasing means 52, the wedge member 51 undergoes a slight elastic deformation in a direction to close the slit 51c. This allows the wedge member 51 and the slider 16 to be uniformly in contact with each other, thereby preventing the side surface 51b of the wedge member 51 and the side surface 16b of the slider 16 from being locally brought into strong contact with each other. Therefore, the side surfaces 51b and 16b can be entirely and uniformly brought into contact with each other, and the slider 16 can be stably pressed toward the wall surface 11a of the U-shaped groove 11 by averagely pressing the side surface 16b.

Accordingly, in addition to the same effects as the first to fourth embodiments, this embodiment has an effect of preventing an instance where the sliding movement of the slider 16 is deterred due to the pressing force of the wedge member 51 acting locally strongly on the side surfaces 51b and 16b, e.g. locally proximate the biasing means. Thus, a smooth cutting can be performed by causing the slider 16 to smoothly slide. This is particularly effective, for example, in the case where many biasing means 52 cannot be disposed because of restricted dimensions of the tool main body 1.

Further, according to this embodiment, the wedge biasing means 52 includes the pressing member 55, the coil spring 54 as a spring member, and the set screw 53 as an adjustment member. The force of the coil spring 54 pressing the wedge member 51 via the pressing member 55, i.e., the biasing force of the wedge biasing means 52, can be adjusted by moving the set screw 53 in the screw hole 56—by fastening or loosening it. In this way, the force of the wedge member 51 pressing the slider 16 can be suitably adjusted.

Although the wedge member 51 is biased by the single wedge biasing means 52 in this embodiment, a plurality of wedge biasing means 52 may be disposed along the generatrix depending upon the size of the tool main body 1, the working conditions, etc. Further, as a spring member, a disk spring may be used instead of the coil spring 54. Furthermore, a spherical member of metal or like material may be used as the pressing member and the notch 51d may be formed to have a V-shaped cross section. Then, the biasing force can be constantly transmitted in a fixed direction to stabilize the direction in which the slider 16 is pressed, with the result that the shakiness of the slider can be more securely prevented.

Figure 13:
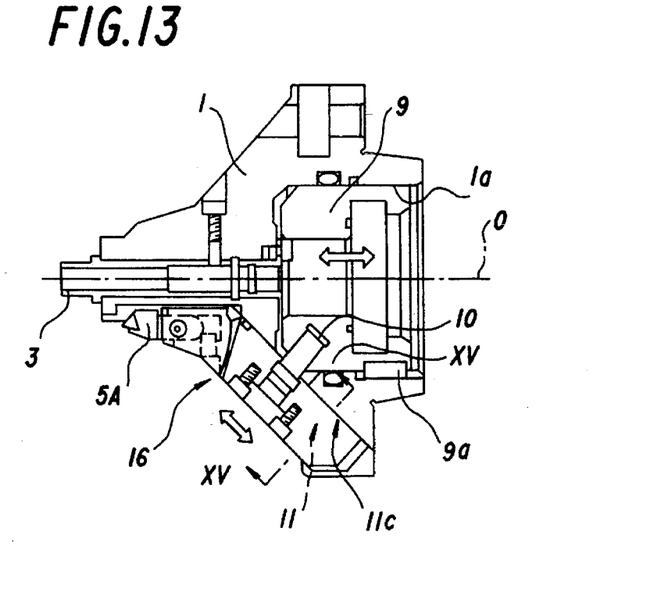
FIG. 13 is a section of a sixth embodiment according to the invention.
Figure 14:
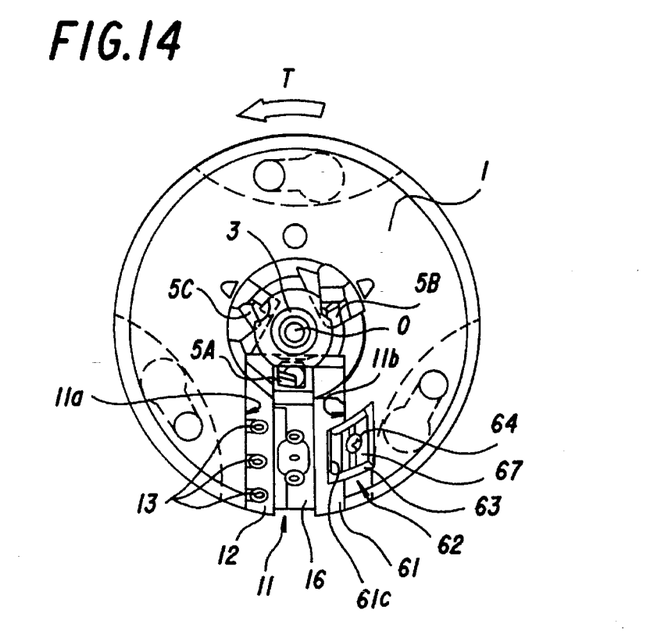
FIG. 14 is a front view of the sixth embodiment of FIG. 13.
Figure 15:
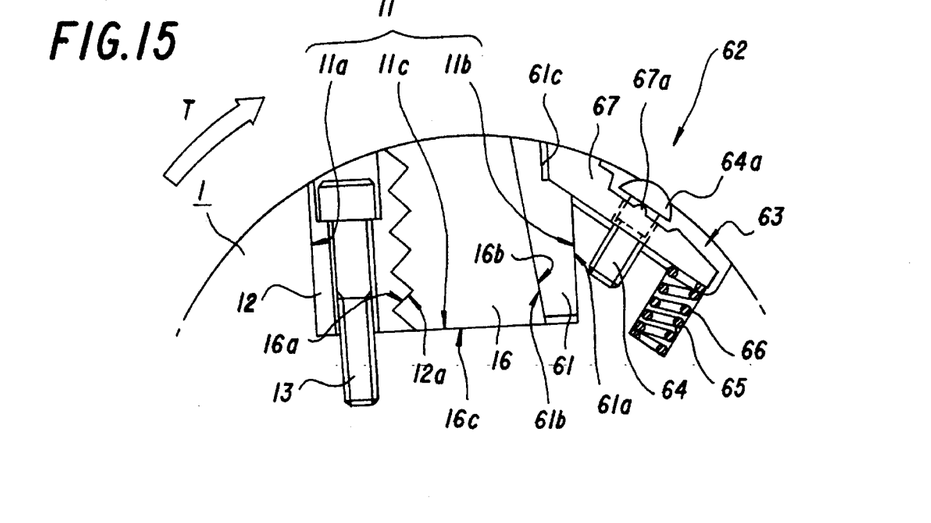
FIG. 15 is a section along line XV—XV of FIG. 14.

FIGS. 13 to 15 show a sixth embodiment. Elements in common with the first to fifth embodiments are identified by the same reference numerals, and no detailed description therefore is given.

In the sixth embodiment, a wedge member 61 is mounted at the wall surface 11b of the U-shaped groove 11 facing backward with respect to the rotating direction T, and a wedge biasing means 62 is mounted downstream from the wall surface 11b with respect to the rotating direction T. More specifically, a recess 63 in communication with the U-shaped groove 11 is formed in the outer surface of the tool main body 1. The wedge biasing means 62 of this embodiment is disposed in the recess 63. The wedge biasing means 62 of this embodiment includes an adjustment screw 64, a coil spring (spring member) 66, a plate-like pressing member 67. The adjustment screw 64 is spirally inserted substantially in a radial direction of the tool main body 1 which is normal to the bottom surface of the recess 63. The coil spring 66 is inserted into a mount hole 65 which is formed in the bottom surface of the recess 63 such that the adjustment screw 64 is located between the U-shaped groove 11 and the mount hole 65. The pressing member 67 is formed in its center with a hole into which the adjustment screw 64 is loosely inserted, and the surface thereof around the periphery of the hole is in contact with the underside of a head 64a of the adjustment screw 64. Further, the opposite ends of the pressing member 67 are in contact with an upper end of the coil spring 66 and an upper part of the wedge member 61, respectively. A support protrusion 67a having substantially a semicircular cross section is formed in a center position of the pressing member 67 which is in contact with the underside of the head 64a of the adjustment screw 64. Accordingly, the pressing member 67 is pivotable about the support 67a within the recess 63 while loosely holding the adjustment screw 64. Further, a notch 61c is formed at the upper part of the wedge member 61, and a first end of the pressing member 67 is fitted in the notch 61c to contact the wedge member 61. While being compressed, the coil spring 66 is loosely inserted in the mount hole 65 and contacts the other end of the pressing member 67. The pressing member 67 pressed with an elastic force of the coil spring 66 which tries to expand, so as to rotate counterclockwise in FIG. 3 about the support 67a. As a result, the first end of the pressing member 67 biases the wedge member 61 toward the bottom surface 11c of the U-shaped groove 11. In other words, the pressing member 67 acts as a lever having the support 67a as a fulcrum, the first end thereof in contact with the wedge member 61 as a point of action, and the other end thereof in contact with the coil spring 66 as a point of force where a force is applied.

In the wedge biasing means 62, the coil spring 66 is compressed and expanded, i.e. the elastic force thereof is adjustable by fastening and loosening the adjustment screw 64. Accordingly, the force with which the first end of the pressing member 67 presses the wedge member 61 toward the bottom surface 11c of the U-shaped groove 11, i.e., the biasing force of the wedge biasing means 62 to bias the wedge member 61 can be adjusted. This biasing force can be changed by replacing the coil spring 66 with one having a different spring constant, or by changing the lengths between the opposite ends of the pressing member 67 acting as a lever and the support 67a.

Although only the single wedge biasing means 62 is, as shown in FIG. 14, provided in this embodiment, the number of the wedge biasing means 62 may be suitably set depending upon the size of the tool main body 1, working conditions, and other factors similar to the wedge biasing means 43 and 52 of the other embodiments. A plurality of wedge biasing means 62 may be disposed in parallel along the generatrix. In the case where a plurality of wedge biasing means 62 are disposed, the pressing member 67 may be an integral part of each wedge biasing means 62.

In addition to the effects in common with the first to fifth embodiments, the cutting tool thus constructed has the following effects. Since the wedge biasing means 62 presses or biases the wedge member 61 toward the bottom surface 11c of the U-shaped groove 11 by the action of the pressing member 67 as a lever, the wedge member 61 can be biased with a multiplied elastic force of the coil spring 66 which tries to expand depending upon a ratio of a distance between the first end of the pressing member 67 as a point of action and the support 67a to a distance between the support 67a and the other end of the pressing member 67 as a point of force. Thus, even in the case where a coil spring having a large elastic force cannot be used because of the size restriction of the tool main body 1 or other factors, a sufficient biasing force can be ensured by suitably setting the above ratio.

It will be apparent to those skilled in the art that the embodiments described may be varied as discussed above and in other manners, such as to meet particular specialized requirements, without departing from the true spirit and scope of the invention as claimed. For example, although the most preferred embodiments have been discussed, the present invention contemplates utilizing aspects of the 1st–6th embodiments in other ones of the embodiments, e.g. in other arrangements, as would be apparent from the present disclosure.

Industrial Application

As described above, according to the present invention, abrasion and deformation caused by the cutting load transmitted from the cutting tip via the slider and the sliding movement of the slider mainly occur in the spacer mounted between the slider and the wall surface of the U-shaped groove. Accordingly, in the case where abrasion and/or deformation occur in the cutting tool, the slider can be easily mounted in a proper position again with accuracy by replacing the spacer, thereby maintaining working accuracy. Further, this cutting tool is economical since the standard of the replacement members does not change each time they are replaced. Further, since the space and the slider are formed with the engaging portion and the engaged portion which are engageable with each other, the slider can be mounted with an improved rigidity. Furthermore, since the slider is biased toward the wall surface of the groove in which the spacer is disposed with an elastic force, upon a slight abrasion between the engaging portion of the spacer and the engaged portion of the slider, the cutting can be continued while suppressing the shakiness of the slider. Therefore, a life of the cutting tool can be extended and a labor required for the maintenance or the like can be reduced.

What is claimed is:

1. A cutting tool, comprising:

a substantially conic main body which is rotated about its longitudinal axis, a U-shaped groove having a U-shaped cross section and extending along a generatrix of the conic main body, a slider equipped with a cutting tip and slidably mounted in the U-shaped groove, and a coupling member provided in the main body which is rotatable with the main body, movable forward and backward along the longitudinal axis, and engages the slider to slide the slider, wherein;

a spacer is detachably mounted between one of a pair of wall surfaces of the U-shaped groove facing each other and the slider, the spacer being formed with an engaging portion extending along the generatrix, an engaged portion engageable with the engaging portion is formed on one side surface of the slider which is brought into contact with the spacer, and biasing means which biases the slider toward the one wall surface of U-shaped groove with an elastic force.

2. A cutting tool according to claim 1, wherein said biasing means is provided at the other wall surface or the other side surface of the slider facing the other wall surface for biasing the slider toward the one wall surface.

3. A cutting tool according to claim 2, wherein the biasing means comprises:

a pressing member which is projectable from either the other wall surface of the U-shaped groove or the other side surface of the slider and which comes into contact with the other surface, a spring member for pressing the pressing member toward the other surface, and an adjustment member for adjusting a pressing force of the spring member.

4. A cutting tool according to claim 3, wherein the pressing member comprises a rollable spherical member at its leading end.

5. A cutting tool according to claim 2, wherein the biasing means includes a flat plate member mounted between the other wall surface of the U-shaped groove and the other side surface of the slider.

6. A cutting tool according to claim 1, further comprising:

a wedge member which is detachably mounted between the other wall surface and the slider and which is biasable so as to be thrust toward the bottom surface of the U-shaped groove, thereby pressing the slider toward the one wall surface to engage the engaging portion and the engaged portion, and wedge biasing means for biasing the wedge member toward the bottom surface of the U-shaped groove.

7. A cutting tool according to claim 6, wherein the wedge biasing means includes an adjustment bolt which is spirally inserted through the wedge member into a screw hole formed in the bottom surface of the U-shaped groove, and a spring member which is mounted between a head of the adjustment bolt and the wedge member and which is adapted to push the wedge member toward the bottom surface of the U-shaped groove.

8. A cutting tool according to claim 1, further comprising:

a wedge member which is detachably mounted between the other wall surface and the slider, and which is biasable so as to be thrust toward the bottom surface of the U-shaped groove, thereby pressing the slider toward the one wall surface to engage the engaging portion and the engaged portion, wherein the wedge member is formed with a slit which extends in parallel with the other wall surface of the U-shaped groove along the generatrix, and which is elastically deformable in directions to open and close the slit, and wedge biasing means provided at the other wall surface of the U-shaped groove for biasing the wedge member toward the one wall surface and toward the bottom surface of the U-shaped groove.

9. A cutting tool according to claim 8, wherein the wedge biasing means includes a pressing member which is projectable from the other wall surface of the U-shaped groove and which comes into contact with the wedge member, a spring member for pressing the pressing member, and an adjustment member for adjusting a pressing force of the spring member.

10. A cutting tool according to claim 1, further comprising:

a wedge member which is detachably mounted between the other wall surface and the slider, and which is biasable so as to be thrust toward the bottom surface of the U-shaped groove, thereby pressing the slider toward the one wall surface to engage the engaging portion and the engaged portion, and wedge biasing means which is provided in a position of the main body facing the other wall surface of the U-shaped groove and which biases the wedge member toward the bottom surface of the U-shaped groove.

11. A cutting tool according to claim 10, wherein the wedge biasing means includes an adjustment screw which is spirally mounted in a position of the main body facing the other wall surface of the U-shaped groove, a spring member inserted into a mount hole which is formed such that the adjustment screw is located between the U-shaped groove and the mount hole, and a pressing member having a center portion which comes into contact with the underside of a head of the adjustment screw and having opposite ends which come into contact with an upper part of the spring member and an upper part of the wedge member, respectively, and wherein the wedge member is biased toward the bottom surface of the U-shaped groove by way of the pressing member with a force of the spring member which tries to expand.

12. A cutting tool according to any of claims 1 to 11, wherein the engaging portion and the engaged portion are serration grooves extending along the generatrix, respectively.

* * * * *